US008495657B1

(12) United States Patent
Ramamurthy et al.

(10) Patent No.: US 8,495,657 B1
(45) Date of Patent: Jul. 23, 2013

(54) VIRTUALIZED MANAGEMENT OBJECTS

(75) Inventors: Venkatesh Ramamurthy, Lilburn, GA (US); Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 335 days.

(21) Appl. No.: 12/813,951

(22) Filed: Jun. 11, 2010

Related U.S. Application Data

(60) Provisional application No. 61/186,657, filed on Jun. 12, 2009.

(51) Int. Cl.
*G06F 3/00* (2006.01)

(52) U.S. Cl.
USPC .................... 719/316; 719/313; 719/328

(58) Field of Classification Search
None
See application file for complete search history.

(56) References Cited

U.S. PATENT DOCUMENTS

| | | | | |
|---|---|---|---|---|
| 7,028,307 | B2 * | 4/2006 | Thiele | 719/313 |
| 8,272,001 | B2 * | 9/2012 | Della Peruta | 719/328 |
| 2003/0037177 | A1 * | 2/2003 | Sutton et al. | 719/316 |
| 2004/0073806 | A1 * | 4/2004 | Zimmer | 713/189 |
| 2004/0187137 | A1 * | 9/2004 | Huang | 719/316 |
| 2005/0267959 | A1 * | 12/2005 | Monga et al. | 709/223 |
| 2008/0016143 | A1 * | 1/2008 | Bumpus et al. | 709/203 |
| 2008/0178194 | A1 * | 7/2008 | Longobardi | 719/316 |
| 2009/0287667 | A1 * | 11/2009 | Kannan | 707/4 |

OTHER PUBLICATIONS

"System Management Common Information Model", version 6 release 1, IBM, 2008, pp. 1-116.*
"Managing VMware ESXi", VMWare, 2008, pp. 1-13.*

* cited by examiner

*Primary Examiner* — Tuan Dao
(74) *Attorney, Agent, or Firm* — Morris Manning & Martin, LLP; Tim Tingkang Xia, Esq.

(57) ABSTRACT

Technologies for virtualized management objects are presented herein. Through the utilization of the technologies and concepts presented herein, a management entity may be able to access a management object through a computer firmware that utilizes a virtualized layer that interfaces a management interface server and a CIM provider associated with the management object. According to one aspect, a method for virtualizing management objects includes receiving a request for data associated with a management object from a management entity. The request for data may be in a first standard. The request is then converted into a command in a second standard. The command is then executed and a response to the command is generated. Next, the response to the command is converted to a response to the request in the first standard. The converted response to the request is then sent to the management entity.

23 Claims, 3 Drawing Sheets

VIRTUALIZED MANAGEMENT OBJECTS

CROSS-REFERENCE TO RELATED APPLICATIONS

This application claims the benefit of U.S. provisional patent application No. 61/186,657, filed on Jun. 12, 2009, which is expressly incorporated herein by reference in its entirety.

BACKGROUND

Computer systems typically include core services and hardware. From a computer management perspective, these core services and hardware may be viewed as a collection of management objects. Management or remote management of these objects may be provided over a management interface. A traditional management object management approach may use a common information model object manager (CIMOM) as an object manager, or broker, for accessing management objects externally or internally within a computer system. The management objects may be represented by a CIMOM, which is a component of the computer system that provides object management, including exposing interfaces for accessing these objects to entities that reside outside or within the computer system.

Typical computer systems may implement and expose other interfaces to access objects represented in the CIMOM. Some prevalent interfaces include Web Services for Management (WSMAN) for web access and systems management architecture for server hardware—command line protocol (SMASH CLP) for command line access. A bridge may couple these interfaces with the CIMOM. The CIMOM may communicate with the interfaces via the bridge using Common Information Model eXtensible Markup Language (CIM-XML) or a binary interface protocol. In typical implementations, the WSMAN interface may be implemented as a plug-in to the standard web server or as a standalone web server.

An external user may issue a command to a WSMAN interface using a WSMAN protocol, which may be Simple Object Access Protocol (SOAP) over hypertext transfer protocol (HTTP). The WSMAN interface may then internally issue the command to the CIMOM, via the bridge, which converts the command from the WSMAN protocol to the CIM-XML protocol or binary interface protocol. Once the command is converted to the CIM-XML protocol or binary interface protocol, the CIMOM may execute the command, generate a response via an appropriate CIM provider and return the response to the WSMAN interface using the CIM-XML protocol or binary interface protocol. The WSMAN interface may then parse and re-code the response from the CIM-XML protocol or the binary interface protocol into the WSMAN protocol. Similar coding and decoding may be performed for a SMASH CLP interface. For example, the SMASH CLP interface may be configured to convert data between the SMASH CLP protocol and the CIM-XML protocol or the binary interface protocol in a similar manner. In embedded systems, where volatile and non-volatile memory requirements and CPU performance are constrained, the use of a bridge and CIMOM leads to inefficiencies.

The CIMOM may be approximately 1.5 MB to 2 MB in size or even larger. In addition, the CIMOM may operate with a Common Information Model (CIM) object repository that provides central storage area for instrumentation or class definition data associated with the management objects. The CIMOM may use the CIM repository when servicing requests from a management application for data regarding management objects. The CIM repository may generally be approximately 5 MB in size. In embedded systems where memory resources are scarce, storing the CIMOM and the CIM repository reduces the remaining memory resources of the embedded system, making the use of the CIMOM and CIM repository undesirable.

It is with respect to these and other considerations that the disclosure presented herein has been made.

SUMMARY

The following disclosure is directed to technologies for virtualized management objects. Through the utilization of the technologies and concepts presented herein, a management entity may be able to access a management object through a computer firmware that utilizes a virtualized layer that interfaces a management interface server and a CIM provider associated with the management object.

According to one aspect, a method for virtualizing management objects includes receiving a request for data associated with a management object from a management entity. The request for data may be in a first standard. The request is then converted into a command in a second standard. The command is then executed and a response to the command is generated. The response to the command is then converted to a response to the request in the first standard. The converted response to the request is then sent to the management entity.

In various embodiments, the management interface server may be a WSMAN server or a SMASH CLP server. According to one embodiment, where the management interface server is a WSMAN server, the request for data may be in the WSMAN standard. However, if the management interface server is a SMASH CLP server, the request for data may be in the SMASH CLP standard.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
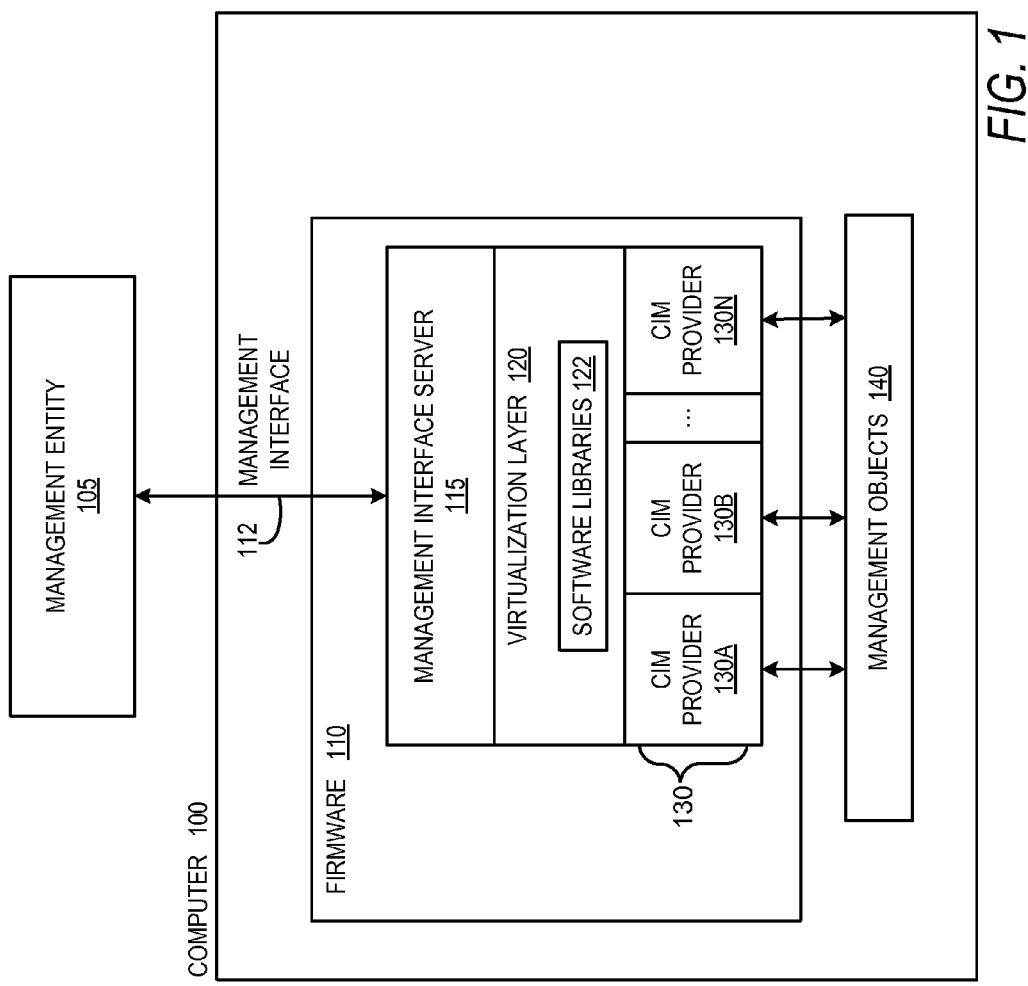
FIG. 1 is a computer software and hardware architecture diagram showing an illustrative operating environment along with several software components provided in embodiments disclosed herein.

The following disclosure is directed to technologies for virtualized management objects. The management objects may be accessed from a management entity for the purpose of managing a computing system or embedded system associated with the management objects. Through the utilization of the technologies and concepts presented herein, a thin virtualization layer may provide the interface between a management interface server, such as a Web Services for Management (WSMAN) server or a Systems Management Architecture for Server Hardware—command line protocol (SMASH CLP) server and CIM providers. The virtualization layer may provide all, or substantially all, of the support functionality used by the CIM providers for supporting the operation of the CIM providers in a virtualized sense without the use of a Common Information Model Object Manager (CIMOM).

While the subject matter described herein is presented in the general context of program modules that execute in conjunction with the execution of a basic input/output system (BIOS), operating system, or application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, remote management controllers embedded in the PC/Server motherboards and the like.

In the following description, references are made to the accompanying drawings that form a part hereof, and which are shown by way of illustration, specific embodiments, or examples. Referring now to the drawings, in which like numerals represent like elements throughout the several figures, aspects of a firmware supporting a thin virtualization layer providing an interface between a management interface server and one or more CIM providers will be described.

Turning now to FIG. 1, details will be provided regarding an illustrative operating environment and several software components provided by the embodiments presented herein. In particular, FIG. 1 shows aspects of a computer 100 including a firmware 110, a management interface 112, and management objects 140. Management or remote management of the management objects 140 associated with the computer 100 may be provided over the management interface 112 to a management entity, such as an external management entity 105 that resides outside the computer 100, or an internal management entity (not shown) that resides within the computer. The management interface 112 may be a network interface such as Ethernet or any other networking or interconnection technology. The management interface 112 may support HTTP, Transmission Control Protocol/Internet Protocol (TCP/IP), XML, or any other protocols, data transport, or data encapsulation techniques. The management interface 112 to the external management entity 105 may use HTTP/HTTPS technology along with CIM-extensible markup language (CIM-XML) as a content format and protocol. According to various embodiments, the internal management entity may use binary interface as a content format and protocol.

Core services and hardware of the computer 100 may be viewed, from a computer management perspective, as a collection of management objects, such as the management objects 140. The management objects 140 may, for example, be either physical or logical enterprise components. These components may be modeled using CIM. Some examples of the management objects 140 may include hardware, such as a cable, or software, such as a database application. As further examples, the management objects 140 may include user objects and hardware devices, such as a fan, thermal sensors a WIN32 object, or various other types of objects.

Through the use of the firmware 110, the management entity 105 can manage the management objects 140 without the use of a CIMOM. To do so, the firmware 110 may include a management interface server 115, a virtualization layer 120, and one or more CIM providers 130A, 130B, 130N, generally referred to hereinafter as CIM providers 130.

The management interface server 115 may be supported by the firmware 110. For instance, a WSMAN server or a SMASH CLP server may operate within the firmware 110 as the management interface server 115. The management interface server 115 may be configured to receive, from the management entity 105, a request for data in a first standard, extract information associated with the request from the request, and call one or more software libraries 122 within the virtualization layer 120. The management interface server 115 may further be configured to receive a response that is generated upon executing the call, convert the response from a second standard to the first standard, and then provide the requested data to the management entity 105 that requested the data in the first standard. Details regarding the functionality of the management interface server 115 will be described in further detail with regards to FIG. 2.

The CIM providers 130 may be virtualized with the aid of the virtualization layer 120. The virtualization layer 120 may include one or more software libraries 122 that provide a thin functionality for the CIM providers 130. The one or more software libraries 122 may include information associated with the management objects 140, such as the name, class, and location of each of the managed objects, and the name and location of one or more CIM providers 130 associated with each of the managed objects. In addition, the software libraries 122 may be databases that are able to store information associated with each of the management objects, such that when the management interface server 115 makes a call to the one or more software libraries 122, the software libraries are able to execute the call accordingly. It should be appreciated that once the CIM providers 130 are virtualized, the CIM providers 130 may be run within, or in association with, the management interface server 115. For example, the CIM providers 130 may be run within a WSMAN server or a SMASH-CLP server. Additional details regarding the functionality of the virtualization layer 120 is provided below in regard to FIG. 2.

The management objects 140 may be accessed through the one or more data providers, such as CIM providers 130. The CIM providers 130 may be configured to serve as mediators between the management objects 140 and the management interface server 115. The CIM providers 130 may supply instrumentation data for parts of a CIM schema. When the management interface server 115 receives the request for data from the management entity 105, the management interface server 115 may provide the request to the appropriate CIM provider, such as CIM provider 130A, through the virtualization layer 120. The CIM provider 130A may be configured to supply data and event notifications for a specified management object to the management interface server 115 through the virtualization layer 120. In turn, this data can be returned by the management interface server 115 to the management entity 105 via the management interface 112. According to embodiments, each managed object is managed by a specific CIM provider. Therefore, a first managed object may be managed by CIM provider 130A, while a second managed object may be managed by CIM provider 130B, and the like. In this way, when a request for data associated with a particular managed object is received, the request is fulfilled by an appropriate CIM provider that is configured to manage that particular managed object.

Traditionally, CIM providers 130 operate through, or in association with, a CIM Object Manager (CIMOM). According to the technology presented herein, the virtualization layer 120 may provide the interface between the management interface server 115 and the CIM providers 130. The virtualization layer 120 may provide all, or substantially all, of the support functionality used by the CIM providers 130. Such functionality can support operation of the CIM providers 130 in a virtualized sense without association with a CIMOM. Such functionality provided by the virtualization layer 120 may include provider invocation from another provider, memory management, garbage collection, standard interface application programming interfaces (APIs), and so forth. An exemplary CIM provider, such as CIM provider 130A, may supply event notification data to the management interface server 115 through the virtualization layer 120. Such direct communication functionality between the management interface server 115 and the CIM providers 130 may avoid an intermediate CIM-XML translation as encountered in traditional management object approaches.

Communication between the virtualization layer 120 and the CIM providers 130 may use Common Manageability Programming Interface (CMPI) or other standard interfaces. Supporting the same standard communication approaches between the virtualization layer 120 and the CIM providers 130 as is traditionally used between a CIMOM and a CIM provider 130 can allow the CIM providers 130 to operate as written for traditional CIMOM oriented systems in a virtualized sense without a need for a CIMOM. Accordingly, the virtualization layer 120 may act as, or support, a quasi object manager (QoM).

According to embodiments presented herein, the management interface server 115 may be executed within the same process. As such, context switching between the management interface server 115 and a separate CIMOM server to support the CIM providers 130 may be avoided and system efficiency may be improved. It should be appreciated that because the CIM providers 130 may become virtualized and may run within the management interface server 115, the computer 100 may only need to execute a single process to execute a request for data from a management entity. In traditional systems involving a CIMOM, the computer 130 had to execute the management interface server 115 in one process and the CIMOM in a separate process. By way of virtualizing the CIM providers 130 via the virtualization layer 120, the computer can now execute the operations performed by the management interface server 115 and the virtualization layer 120 through a single process, making the computer more efficient.

Generally, a CIMOM may be approximately 1.5 MB to 2 MB in size or even larger. In contrast, the virtualization layer 120 may be approximately 100 KB to 150 KB. Due to this smaller size, the virtualization layer 120 can be implemented on an embedded system where volatile and non-volatile memory resources as well as CPU performance may be constrained. As such, the technologies presented herein may extend management object mechanisms to smaller and more embedded systems than previously supported.

In addition, a CIMOM traditionally operates with a CIM object repository that provides central storage area for instrumentation and class definition data associated with the CIM providers 130. The CIM repository may be used when servicing requests from a management entity for data regarding management objects of a computer. The CIM repository may generally be approximately 5 MB in size while similar support may be provided within the virtualization layer 120 using approximately 100 KB of storage. Again, the reduced storage requirements of the virtualized approach presented herein may support management object mechanisms on smaller and more embedded systems than possible in traditional approaches.

The firmware 110 associated with the computer 100 may be a BIOS, a legacy BIOS, an extensible firmware interface (EFI) firmware, a unified EFI (UEFI) firmware, or any other firmware configured to support operation of the computer 100. The firmware 110 may also be associated with an embedded system. According to one or more embodiments, the firmware 110 may be embedded within a baseboard management controller (BMC) for managing a computer. Such a BMC may be embedded within a video chip, baseboard chipset, or other circuitry or module associated with a computer or embedded computing system.

The computer 100 may execute an operating system configured to provide functionality to a desktop or laptop computing system. For example, according to embodiments, the operating system may comprise one of the WINDOWS family of operating systems from MICROSOFT CORPORATION, the OSX operating system from APPLE COMPUTER, INC., the LINUX operating system, an embedded operating system, a real-time operating system, or another type of computer operating system known in the art.

The following example may clarify aspects of FIG. 1. As described above, the management entity 105 may send a request for data associated with a management object 140 to the management interface server 115 via the management interface 112. According to the following example, the request for data may be a request to add a user to a user management database (not shown) for remote management purposes. The user management database may be an example of the managed object 140, while the management interface server 115 may be a WSMAN server. The WSMAN server may receive the request for data in the WSMAN standard. The WSMAN server may extract information from the request for data. For instance, the extracted information may include the name of the user to add and the name of the user management database. Once the information is extracted, the WSMAN server may make a call using the extracted information to one or more software libraries 122 of the virtualization layer 120 including the user management database and the user to be added as arguments associated with the call.

The virtualization layer 120 may determine the appropriate CIM provider to which the call should be forwarded by performing a look-up operation in the one or more software libraries 122. This may be done by searching the one or more software libraries 122 for the user management database. The one or more software libraries 122 may include data indicating the CIM provider 130 that manages the user management database.

Once the virtualization layer 120 determines the appropriate CIM provider capable of updating the user management database, the virtualization layer 120 may convert the call to a CMPI command and send the CMPI command to the appropriate CIM provider, such as CIM provider 130A. As the CIM providers were previously configured to communicate with a CIMOM using CMPI commands, the virtualization layer 120 is configured to convert the call to a CMPI command such that the CIM providers may communicate with the virtualization layer 120 without having to be reconfigured to communicate using calls made from the management interface server 115.

Once the CIM provider 130A receives the CMPI command, the CIM provider 130A may execute the CMPI command by adding a user to the user management database. The CIM provider 130A may then provide a CMPI response to the CMPI command to the virtualization layer 120. The virtualization layer 120 may then convert the CMPI response into a call response, and send the call response to the management interface server 115. The management interface server 115 may then convert the call response into a WSMAN response and send the WSMAN response to the management entity 105 that requested the data.

Figure 2:
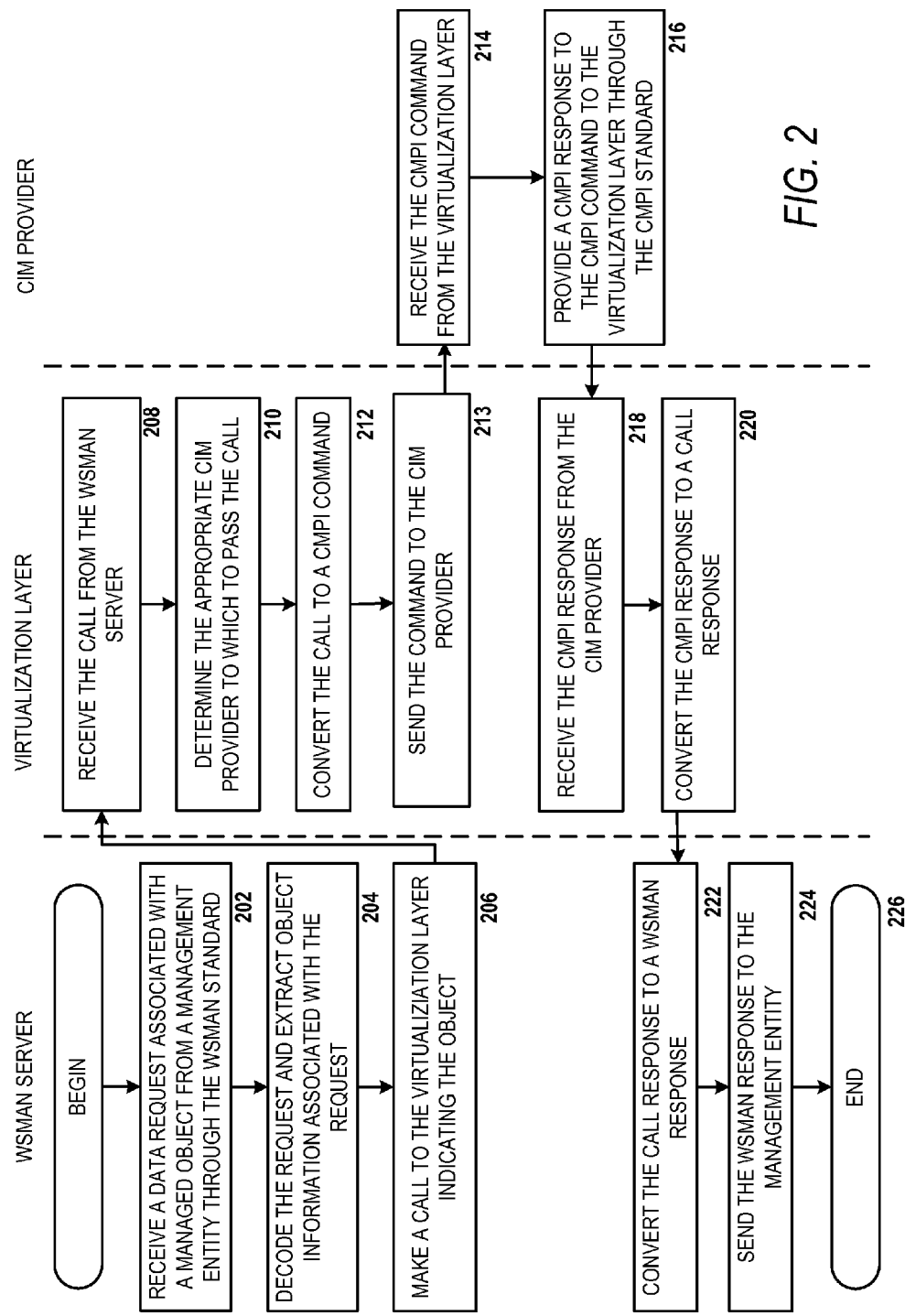
FIG. 2 is a logical flow diagram illustrating a process for providing data associated with management objects to a management entity provided in embodiments disclosed herein.

Referring now to FIG. 2, additional details will be provided regarding the embodiments presented herein for virtualized management objects. In particular, FIG. 2 is a logical flow diagram illustrating a process for providing requested data associated with management objects to a management entity in the manner disclosed herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

As shown in FIG. 2, a routine 200 begins at operation 202, where the management interface server 115, such as the WSMAN server, receives a data request associated with a management object 140 from the management entity 105. The data request may be sent to the WSMAN server using a WSMAN standard protocol for web services, such as SOAP over HTTP. The data request may include information associated with a particular management object, such as the object name, the object class, parameters associated with the request, and the like. Using the example described above, the data request may be a request to add a user to a user management database (not shown) for remote management purposes and the user management database may be the name of the management object.

From operation 202, the routine 200 proceeds to operation 204, where the WSMAN server may decode the request and extract the information associated with the particular management object from the data request. Using the example described above, the information may include the name of a user and the name of the user management database. Once the information associated with the request is extracted, the routine 200 proceeds to operation 206, where the WSMAN server makes a call to the virtualization layer 120 using the extracted information to execute the data request associated with the managed object. According to embodiments, the call may be an internal process call, such as a call to a software library. Continuing with the example described above, the call may include a function to add a user, as well as the name of the user and the name of the user management database.

From operation 206, the routine 200 proceeds to operation 208, where the virtualization layer 120 receives the call from the WSMAN server. The call may include one or more of the object name, object class, and parameters associated with the request. From operation 208, the routine 200 proceeds to operation 210, where the virtualization layer 120 performs a look up operation in the one or more software libraries 122 of the virtualization layer 120 using the object name, such as the name of the user management database and/or object class to determine the appropriate CIM provider to which the call is to be forwarded. Using the example data request provided above, the virtualization layer 120 may be configured to perform a look up operation for the user management database in one of the software libraries to determine the appropriate CIM provider for handling data requests associated with the user management database.

Once the virtualization layer 120 determines the appropriate CIM provider, the routine 200 proceeds from operation 210 to operation 212, where the virtualization layer 120 converts the call to a CMPI command. According to embodiments, an internal conversion takes place within the virtualization layer 120, which may be configured to generate a CMPI command using the parameters associated with the data request. From operation 212, the routine 200 proceeds to operation 213, where the command is sent to the appropriate CIM provider via the virtualization layer 120. The CMPI command may be sent to the appropriate CIM provider using the CMPI standard. In this way, the virtualization layer 120 may appear to be a CIMOM to the appropriate CIM provider.

From operation 213, the routine 200 proceeds to operation 214, where the appropriate CIM provider receives the CMPI command associated with the data request and performs the operations required to execute the CMPI command. Using the example described above, the CIM provider may add the name of the user provided in the request for data to the user management database. From operation 214, the routine 200 proceeds to operation 216, where the appropriate CIM provider provides a CMPI response to the CMPI command back to the virtualization layer 120. According to embodiments, the CMPI response to the CMPI command may also be in the CMPI standard. Following the example provided above, the CMPI response to the CMPI command may be an acknowledgment that the user has been added to the user management database. It should be appreciated that because the virtualization layer 120 presents the CMPI command to the CIM provider in the same manner as a CIMOM, the CIM provider responds to the CMPI command to the virtualization layer 120 in the same manner as it would had the CIM provider been communicating with the CIMOM.

From operation 216, the routine 200 proceeds to operation 218, where the virtualization layer 120 receives the CMPI response to the CMPI command from the CIM provider using the CMPI standard. From operation 218, the routine 200 proceeds to operation 220, where the virtualization layer 120 may convert the CMPI response to the format associated with the call made by the WSMAN server and send the converted response to the WSMAN server.

From operation 220, the routine 200 proceeds to operation 222, where the WSMAN server receives the response to the call and converts the response to the WSMAN standard. From operation 222, the routine 200 proceeds to operation 224, where the WSMAN server may send the response to the management entity 105 that sent the data request to the WSMAN server at operation 202. From operation 224, the routine 200 proceeds to operation 226, where the routine 200 ends.

Although the flow diagram in FIG. 2 described a process involving a WSMAN server, it should be appreciated that a similar process is performed if the management interface server was a SMASH CLP server. In embodiments involving a SMASH CLP server instead of the WSMAN server, the management entity 105 and the SMASH CLP server may communicate over a SMASH CLP standard instead of a WSMAN standard, such as SOAP over HTTP. Accordingly, the SMASH CLP server may be configured to make a call to the virtualization layer 120 upon extracting information associated with a data request using the SMASH CLP standard. In addition, the SMASH CLP server may also be configured to convert a response to the call from the virtualization layer 120 back to the SMASH CLP standard before sending the response to the data request to a requesting management entity 105 using the SMASH CLP standard.

Figure 3:
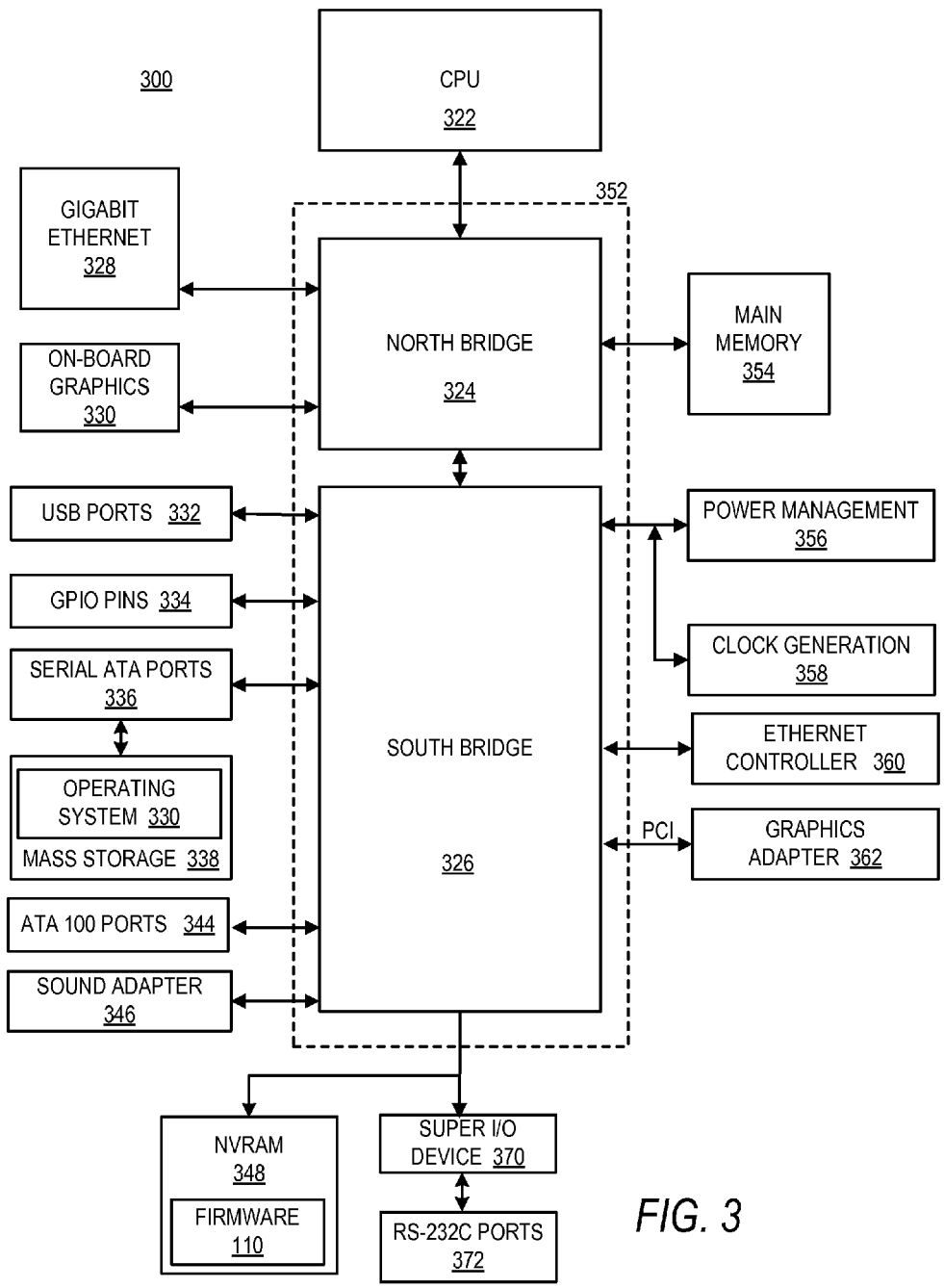
FIG. 3 is a computer architecture diagram showing an illustrative computer architecture that might be utilized to implement a computing system that embodies the various concepts and technologies presented herein.

FIG. 3 shows an illustrative computer architecture for a computer 300 that may be utilized in the implementations described herein. The architecture shown in FIG. 3 may be utilized to embody the computer 100 shown in FIG. 1 and described above.

The computer 300 includes a baseboard, or "motherboard", which is a printed circuit board to which a multitude of components or devices may be connected by way of a system bus or other electrical communication path. In one illustrative embodiment, a CPU 322 operates in conjunction with a chipset 352. The CPU 322 is a standard central processor that performs arithmetic and logical operations necessary for the operation of the computer. The computer 300 may include a multitude of CPUs 322.

The chipset 352 includes a north bridge 324 and a south bridge 326. The north bridge 324 provides an interface between the CPU 322 and the remainder of the computer 300. The north bridge 324 also provides an interface to a random access memory (RAM) used as the main memory 354 in the computer 300 and, possibly, to an on-board graphics adapter 330. The north bridge 324 may also include functionality for providing networking functionality through a gigabit Ethernet adapter 328. The gigabit Ethernet adapter 328 is capable of connecting the computer 300 to another computer via a network. Connections which may be made by the network adapter 328 may include LAN or WAN connections. LAN and WAN networking environments are commonplace in offices, enterprise-wide computer networks, intranets, and the internet. The north bridge 324 is connected to the south bridge 326.

The south bridge 326 is responsible for controlling many of the input/output functions of the computer 300. In particular, the south bridge 326 may provide one or more universal serial bus (USB) ports 332, a sound adapter 346, an Ethernet controller 360, and one or more general purpose input/output (GPIO) pins 334. The south bridge 326 may also provide a bus for interfacing peripheral card devices such as a graphics adapter 362. In one embodiment, the bus comprises a peripheral component interconnect (PCI) bus, but other types of busses may be utilized.

The south bridge 326 is also operative to provide one or more interfaces for connecting mass storage devices to the computer 300. For instance, according to an embodiment, the south bridge 326 includes a serial advanced technology attachment (SATA) adapter for providing one or more serial ATA ports 336 and an ATA 100 adapter for providing one or more ATA 100 ports 344. The serial ATA ports 336 and the ATA 100 ports 344 may be, in turn, connected to one or more mass storage devices storing an operating system 330 and application programs, such as the SATA disk drive 338. As discussed above, an operating system 330 comprises a set of programs that control operations of a computer and allocation of resources. An application program is software that runs on top of the operating system software, or other runtime environment, and uses computer resources to perform application specific tasks desired by the user. As also discussed above, the computer 300 may be configured in the manner described above in conjunction with a firmware supporting virtualized management objects.

The mass storage devices connected to the south bridge 326, and their associated computer-readable media, provide non-volatile storage for the computer 300. Although the description of computer-readable media contained herein refers to a mass storage device, such as a hard disk or CD-ROM drive, it should be appreciated by those skilled in the art that computer-readable media can be any available media that can be accessed by the computer 300.

Computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 326 for connecting a "Super I/O" device 370. The Super I/O device 370 is responsible for providing a number of input/output ports, including a keyboard port, a mouse port, a serial interface 372, a parallel port, and other types of input/output ports. The LPC interface may also connect a computer storage media such as a ROM or a flash memory such as a NVRAM 348 for storing the firmware 110 that includes program code containing the basic routines that help to start up the computer 300 and to transfer information between elements within the computer 300.

The computer 300 may be implemented as a conventional computer system, an embedded control computer, a laptop, or a server computer, a mobile device, a set-top box, a kiosk, a vehicular information system, a mobile telephone, a customized machine, or other hardware platform. The CPU 322 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The firmware 110 may comprise program modules firmware configured for supporting virtualized management objects. The program modules may include software instructions that, when loaded into the CPU 322 and executed, transform a general-purpose computing system into a special-purpose computing system customized to facilitate all, or part of, the virtualized management object techniques disclosed herein. As detailed throughout this description, the program modules may provide various tools or techniques by which the computer 300 may participate within the overall systems or operating environments using the components, logic flows, and/or data structures discussed herein.

The CPU 322 may be constructed from any number of transistors or other circuit elements, which may individually or collectively assume any number of states. More specifically, the CPU 322 may operate as a state machine or finitestate machine. Such a machine may be transformed to a second machine, or specific machine by loading executable instructions contained within the program modules. These computer-executable instructions may transform the CPU 322 by specifying how the CPU 322 transitions between states, thereby transforming the transistors or other circuit elements constituting the CPU 322 from a first machine to a second machine, wherein the second machine may be specifically configured to support virtualized management objects. The states of either machine may also be transformed by receiving input from one or more user input devices, network interfaces 360, 328, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 354, 348 when the software is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

It should be appreciated that the computer 300 may comprise other types of computing devices, including hand-held computers, netbooks, MIDs, embedded computer systems, personal digital assistants, and other types of computing devices known to those skilled in the art. It is also contemplated that the computer 300 may not include all of the components shown in FIG. 3, may include other components that are not explicitly shown in FIG. 3, or may utilize an architecture completely different than that shown in FIG. 3.

Based on the foregoing, it should be appreciated that technologies for firmware supporting multiple boot paths are provided herein. Although the subject matter presented herein has been described in language specific to computer structural features, methodological and transformative acts, specific computing machinery, and computer readable media, it is to be understood that the disclosure presented herein is not necessarily limited to the specific features, acts, or media described herein. The subject matter described above is provided by way of illustration only and should not be construed as limiting. Various modifications and changes may be made to the subject matter described herein without following the example embodiments and applications illustrated and described, and without departing from the true spirit and scope of the disclosure presented herein.

What is claimed is:

1. A computer-implemented method for virtualizing management objects, the method comprising performing computer-implemented operations for:

executing firmware at a processor of a computing device, wherein the firmware includes a management interface server and a virtualization layer, wherein the virtualization layer is not greater than 150 KB such that the management interface server and the virtualization layer are configured to be executed in a same execution context of a execution process of the processor, wherein the virtualization layer provides an interface between the management interface server and at least one common information model (CIM) provider;

executing the management interface server in an execution context such that the management interface server receives a request from a management entity for data associated with a management object, the request for data being in a first standard;

executing the virtualization layer in the execution context such that the virtualization layer converts the request for data from the first standard into a command in a second standard;

executing the command by a CIM provider associated with the management object;

upon executing the command, generating a response to the command using the CIM provider, the response being generated in the second standard;

converting the response to the command into a response to the request in the first standard by the virtualization layer; and sending the response to the request to the management entity.

2. The computer-implemented method of claim 1, wherein the first standard is a web services for management (WS-MAN) standard or a systems management architecture for server hardware command line protocol (SMASH CLP) standard.

3. The computer-implemented method of claim 1, wherein the second standard is a Common Manageability Programming Interface (CMPI) standard.

4. The computer-implemented method of claim 1, wherein executing the command comprises making a call to one or more software libraries comprising data associated with the management object to determine the CIM provider associated with the management object from a plurality of CIM providers, wherein the virtualization layer comprises the one or more software libraries.

5. The computer-implemented method of claim 4, wherein the one or more software libraries virtualization layer comprise a first library that stores data associated with the management object; and wherein the determining the CIM provider to which the command should be forwarded comprises performing a look up operation in the first library using information extracted from associated with the request to retrieve the appropriate CIM provider.

6. The computer-implemented method of claim 1, wherein converting the request for data into a command in a second standard comprises:

extracting information associated with the request; and forwarding the command associated with the request to the virtualization layer.

7. The computer-implemented method of claim 1, further comprises:
  determining a CIM provider to which the command should be forwarded; and
  sending the command to the determined CIM provider.

8. The computer-implemented method of claim 1, wherein receiving, at a management interface server from a management entity, a request for data associated with a management object further comprises receiving the request via a management interface configured to interface the management entity with the management interface server.

9. The computer-implemented method of claim 1, wherein the computing device is a baseboard management controller (BMC).

10. The computer-implemented method of claim 9, wherein the firmware is embedded within a baseboard management controller of the computer.

11. The computer-implemented method of claim 1, wherein the virtualization layer provides substantially all of support functionalities used by the CIM provider and for supporting operation of the CIM provider in a virtualized sense without using a Common Information Model Object Manager (CIMOM), and wherein the virtualization layer is approximately 100 KB to 150 KB.

12. A computer system for virtualizing management objects, comprising:
  a central processing unit (CPU); and
  a non-volatile memory having at least one operating system and firmware executable by the CPU, wherein the firmware includes a management interface server and a virtualization layer, wherein the virtualization layer is not greater than 150 KB such that the management interface server and the virtualization layer are configured to be executed in a same execution context of a execution process of the CPU, wherein the virtualization layer provides an interface between the management interface server and at least one common information model (CIM) provider, the firmware comprising instructions which, when executed by the CPU, cause the CPU to
  execute the management interface server in an execution context such that the management interface server receives from a management entity a request for data associated with a management object, the request for data being in a first standard;
  execute the virtualization layer in the execution context such that the virtualization layer converts the request for data into a command in a second standard;
  execute the command by a CIM provider associated with the management object;
  upon executing the command, generate a response to the command using the CIM provider;
  convert the response to the command to a response in the first standard by the virtualization layer; and
  send the response to the request to the management entity.

13. The computer system of claim 12, wherein receiving a request for data associated with a management object from a management entity comprises receiving the request for data in a first standard.

14. The computer system of claim 12, wherein converting the request for data into a command in a second standard comprises:
  extracting information associated with the request; and
  forwarding the command associated with the request to a virtualization layer.

15. The computer system of claim 14, wherein the management interface server is at least one of a web services for management (WSMAN) server and a systems management architecture for server hardware command line protocol (SMASH CLP) server; and
  wherein the first standard is at least one of a WSMAN standard and a SMASH CLP standard and the second standard is a CMPI standard.

16. The computer system of claim 12, wherein the firmware comprises further instructions, when executing by the CPU, causes the CPU to:
  determine the CIM provider to which the command should be forwarded; and
  send the command to the CIM provider over the second standard.

17. The computer system of claim 12, wherein the firmware comprises the CIM provider.

18. The computer system of claim 12, wherein the CIM provider is configured to interface with at least one managed object within the computer system.

19. The computer system of claim 12, wherein the receiving, at a management interface server, the request further comprises receiving the request via a management interface configured to interface the management entity with the management interface server.

20. A non-transitory computer-readable medium having computer-executable instructions stored thereupon which, when executed by a computer, cause the computer to:
  execute firmware that includes a management interface server and a virtualization layer, wherein the virtualization layer is not greater than 150 KB such that the management interface server and the virtualization layer are configured to be executed in a same execution context of a execution process of a processor of the computer, wherein the virtualization layer provides an interface between the management interface server and at least one common information model (CIM) provider;
  execute the management interface server in an execution context of the processor such that the management interface server receives from a management entity a request for data associated with a management object, the request for data being in a first standard;
  execute the virtualization layer in the execution context such that the virtualization layer converts the request for data into a command in a second standard;
  execute the command by a common information model (CIM) provider associated with the management object;
  upon executing the command, generate a response to the command using the CIM provider, the response being generated in the second standard;
  convert the response to the command to a response in the first standard by the virtualization layer; and
  send the response to the request to the management entity.

21. The non-transitory computer-readable medium of claim 20, wherein converting the request for data into a command in a second standard comprises:
  extracting information associated with the request; and
  forwarding the command associated with the request to a virtualization layer.

22. The non-transitory computer-readable medium of claim 20, having further computer-executable instructions stored thereupon which, when executed by a computer, cause the computer to:
  determine the CIM provider to which the command should be forwarded; and
  send the command to the CIM provider over a second standard.

23. The non-transitory computer readable medium of claim 20, wherein the management interface server is at least one of a web services for management (WSMAN) server and a systems management architecture for server hardware command line protocol (SMASH CLP) server; and
wherein the first standard is at least one of a WSMAN standard and a SMASH CLP standard and the second standard is a CMPI standard.

* * * * *